United States Patent
Takemoto et al.

(10) Patent No.: US 7,007,664 B2
(45) Date of Patent: Mar. 7, 2006

(54) FUEL INJECTION CONTROL SYSTEM OF INTERNAL COMBUSTION ENGINE

(75) Inventors: Eiji Takemoto, Obu (JP); Hiroshi Haraguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/972,479

(22) Filed: Oct. 26, 2004

(65) Prior Publication Data

US 2005/0092297 A1 May 5, 2005

(30) Foreign Application Priority Data

Oct. 31, 2003 (JP) .............................. 2003-371471

(51) Int. Cl.
*F02D 41/04* (2006.01)
*F02P 5/15* (2006.01)
*F02B 5/00* (2006.01)

(52) U.S. Cl. ................ 123/305; 123/406.47; 123/478

(58) Field of Classification Search ................ 123/295, 123/299, 300, 305, 333, 406.47, 435, 436, 123/478, 480, 492, 493, 501; 701/102, 103, 701/104, 105

See application file for complete search history.

(56) References Cited

U.S. PATENT DOCUMENTS

| | | | | |
|---|---|---|---|---|
| 4,996,960 A | * | 3/1991 | Nishiyama et al. | ......... 123/435 |
| 5,038,737 A | * | 8/1991 | Nishiyama et al. | ......... 123/435 |
| 5,682,856 A | * | 11/1997 | Tomisawa et al. | .......... 123/435 |
| 5,769,052 A | | 6/1998 | Oestreicher et al. | ........ 123/383 |
| 5,960,765 A | * | 10/1999 | Iida et al. | .................... 123/305 |
| 6,371,078 B1 | | 4/2002 | Kondo et al. | ............... 123/305 |
| 6,401,703 B1 | * | 6/2002 | Mamiya et al. | ............. 123/295 |
| 6,513,488 B1 | * | 2/2003 | Enoki et al. | ................ 123/305 |
| 2002/0033165 A1 | * | 3/2002 | Enoki et al. | ................ 123/305 |

FOREIGN PATENT DOCUMENTS

| | | |
|---|---|---|
| DE | 197 05 463 A1 | 8/1998 |
| EP | 1 079 087 A | 2/2001 |
| JP | 58-107826 * | 6/1983 |
| JP | 58-152132 A | 9/1983 |
| JP | 58-165229 U | 11/1983 |
| JP | 61-234246 A | 10/1986 |
| JP | 62-32247 A | 2/1987 |
| JP | 2002-180879 A | 6/2002 |

\* cited by examiner

*Primary Examiner*—Willis R. Wolfe, Jr.
(74) *Attorney, Agent, or Firm*—Nixon & Vanderhye P.C.

(57) ABSTRACT

An electronic control unit (ECU) of a fuel injection control system of an internal combustion engine feedback-controls injection timing so that a cylinder pressure maximum value coincides with a target pressure value in an operation range, in which the cylinder pressure maximum value increases as ignition timing advances and torque increases as the ignition timing advances. The ECU feedback-controls the injection timing so that the ignition timing coincides with target timing in another operation range, in which the cylinder pressure maximum value increases as the ignition timing advances but the torque decreases as the ignition timing advances. Thus, the torque can be outputted efficiently by selecting the appropriate feedback control in accordance with the operation range.

17 Claims, 5 Drawing Sheets

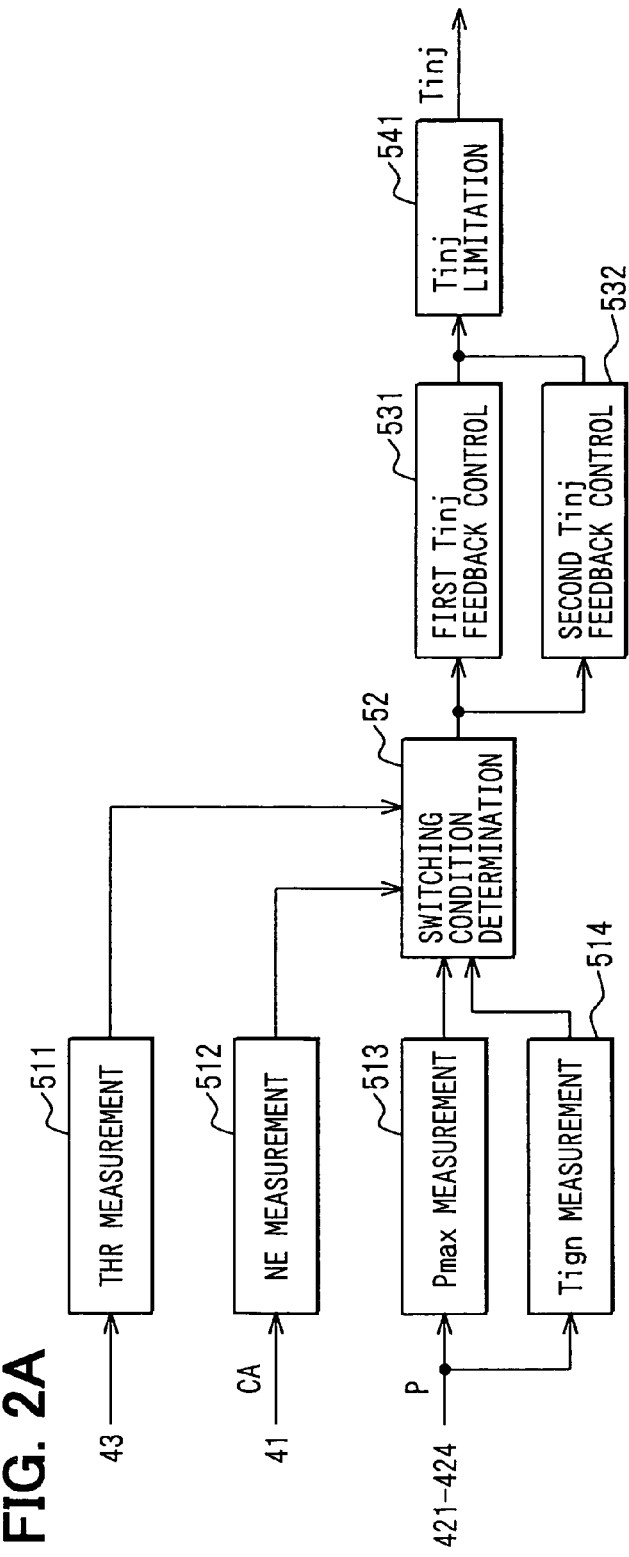
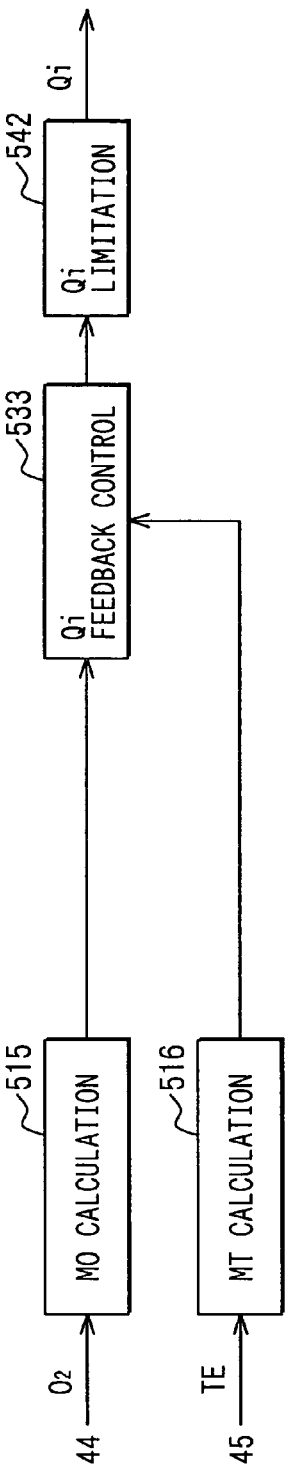
FIG. 2A
FIG. 2B

FUEL INJECTION CONTROL SYSTEM OF INTERNAL COMBUSTION ENGINE

CROSS REFERENCE TO RELATED APPLICATION

This application is based on and incorporates herein by reference Japanese Patent Application No. 2003-371471 filed on Oct. 31, 2003.

BACKGROUND OF THE INVENTION

1. Field of the Invention

The present invention relates to a fuel injection control system of an internal combustion engine.

2. Description of Related Art

A fuel injection control system of an internal combustion engine regulates opening timing and closing timing of injectors, which specify fuel injection timing and a fuel injection quantity. A control section of the fuel injection control system sets the injection timing and the injection quantity so that desired torque is generated and good gas mileage is achieved, based on a result of measurement of an operating state of the engine. A fuel injection control system of a compression ignition type internal combustion engine disclosed in Unexamined Japanese Patent Application Publication No. S61-234246 (Patent Document 1) or No. S62-32247 (Patent Document 2) measures ignition timing as the operating state and feedback-controls the fuel injection timing so that the ignition timing coincides with predetermined target timing. Thus, heat efficiency and the gas mileage can be improved. The technology disclosed in Patent Document 2 stops the feedback control to prevent abnormal advancement of the ignition timing if the operating state is a certain state in which large variations are generated in the ignition timing measurement.

A fuel injection control system disclosed in Unexamined Japanese Petty Patent Application Publication No. S58-165229 (Patent Document 3) or Unexamined Japanese Patent Application Publication No. 2002-180879 (Patent Document 4) measures a cylinder pressure as the operating state and feedback-controls the fuel injection timing so that a maximum value of the cylinder pressure does not exceed a predetermined upper limit value. Thus, the engine can be protected from an excessive increase of the cylinder pressure.

The technology disclosed in Patent Document 1 or Patent Document 2 feedback-controls the fuel injection timing not for protecting the engine but for improving the gas mileage. The technology disclosed in Patent Document 3 or Patent Document 4 feedback-controls the fuel injection timing not for improving the gas mileage but for protecting the engine. More specifically, if the improvement of the gas mileage is maximized, there is a possibility that the engine is damaged. If the protection of the engine is maximized, there is a possibility that the gas mileage is not improved sufficiently. The technology disclosed in Patent Document 2 merely prohibits the improper feedback control when the measurement accuracy of the operating state of the engine is insufficient. This technology does not aim to achieve the improvement of the gas mileage and the protection of the engine at the same time.

SUMMARY OF THE INVENTION

It is therefore an object of the present invention to provide a fuel injection control system of an internal combustion engine for achieving improvement of gas mileage and protection of the engine at the same time.

According to an aspect of the present invention, a fuel injection control system of a compression ignition type internal combustion engine includes state detecting means for detecting an operating state of the engine and controlling means for controlling fuel injection based on the operating state of the engine. The state detecting means includes pressure measuring means for measuring a maximum value of a cylinder pressure of the engine and timing measuring means for measuring ignition timing of the engine. The controlling means includes first feedback-controlling means, second feedback-controlling means and switching means. The first feedback-controlling means feedback-controls fuel injection timing so that the cylinder pressure maximum value coincides with a predetermined target pressure value. The second feedback-controlling means feedback-controls the fuel injection timing so that the ignition timing coincides with predetermined target timing. The switching means selects the first feedback-controlling means in a first operation range, in which the cylinder pressure maximum value increases as the ignition timing advances and torque outputted by the engine increases as the ignition timing advances. The switching means selects the second feedback-controlling means in a second operation range, in which the cylinder pressure maximum value increases as the ignition timing advances but the torque decreases as the ignition timing advances.

In the first operation range, the cylinder pressure maximum value increases as the ignition timing advances and the torque increases as the ignition timing advances. In the second operation range, the cylinder pressure maximum value increases as the ignition timing advances but the torque decreases as the ignition timing advances. In the case where the operation range moves to the second operation range in a state in which the appropriate target pressure value is achieved in the feedback control performed by the first feedback-controlling means in the first operation range, there is a possibility that sufficient torque cannot be outputted if the feedback control is performed by the first feedback-controlling means in the second operation range. Moreover, there is a possibility that the injection timing is advanced excessively. Therefore, when the operation range moves to the operation range in which the cylinder pressure maximum value increases as the ignition timing advances but the torque decreases as the ignition timing advances, the switching means switches from the feedback control performed by the first feedback-controlling means to the feedback control performed by the second feedback-controlling means. Thus, sufficient torque can be outputted and gas mileage can be improved by achieving appropriate target timing through the feedback control.

In the case where the operation range moves to the first operation range in a state in which the appropriate target timing is achieved in the feedback control performed by the second feedback-controlling means in the second operation range, there is a possibility that sufficient torque cannot be outputted if the feedback control is performed by the second feedback-controlling means in the first operation range. Moreover, there is a possibility that the cylinder pressure maximum value increases excessively. Therefore, the switching means switches from the feedback control performed by the second feedback-controlling means to the feedback control performed by the first feedback-controlling means. Thus, the sufficient torque can be outputted and the gas mileage can be improved.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

FIG. 2A is a block diagram showing injection timing control processing performed by the fuel injection control system according to the embodiment;

FIG. 2B is a block diagram showing injection quantity control processing performed by the fuel injection control system according to the embodiment;

DETAILED DESCRIPTION OF THE REFERRED EMBODIMENT

Figure 1:
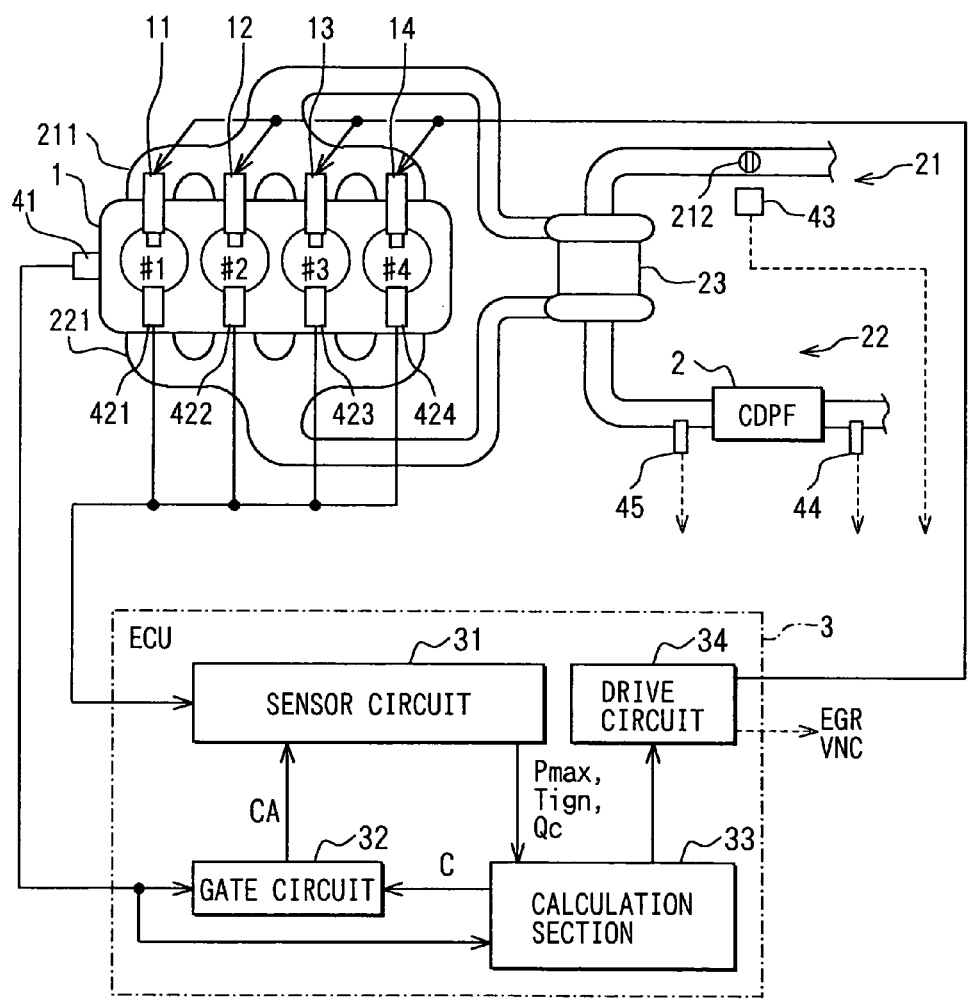
FIG. 1 is a schematic diagram showing a diesel engine having a fuel injection control system according to an embodiment of the present invention.

Referring to FIG. 1, a diesel engine as a compression ignition type internal combustion engine having a fuel injection control system according to an embodiment of the present invention is illustrated. The fuel injection control system of the present embodiment is applied to an automobile. Injectors 11, 12, 13, 14 are mounted to respective cylinders of an engine main body 1 on a one-on-one basis. Each one of the injectors 11, 12, 13, 14 injects fuel by opening at predetermined timing for a predetermined period responsive to control of an electronic control unit (ECU) 3. Exhaust gas generated by combusting the injected fuel is discharged to the ambient air through an exhaust system 22. The exhaust system 22 includes an exhaust manifold 221, whose upstream ends communicate with the cylinders, and a catalytic diesel particulate filter (CDPF) 2 for collecting particulate matters included in the exhaust gas. The diesel engine includes a turbocharger 23 for compulsorily introducing the air into the engine 1 with the use of waste heat of the exhaust gas discharged to the exhaust manifold 221.

The ECU 3 controls the fuel injection based on the operating state of the engine sensed by sensors mounted on various portions of the engine. The sensors include a throttle position sensor 43, a rotation speed sensor 41 and combustion pressure sensors 421, 422, 423, 424. The throttle position sensor 43 senses an operating amount of a throttle valve 212 disposed in an intake system 21, whose downstream end provides an intake manifold 211. The rotation speed sensor 41 senses rotation speed of the engine 1. The combustion pressure sensors 421–424 sense combustion pressures P in the respective cylinders. The combustion pressure sensors 421–424 are mounted to the respective cylinders on a one-on-one basis for sensing the pressures in the cylinders with the use of piezoelectric elements. An air-fuel ratio sensor (an A/F sensor) 44 for sensing oxygen concentration is disposed downstream of the CDPF 2 in the exhaust system 22. An exhaust gas temperature sensor 45 for sensing temperature of the exhaust gas is disposed upstream of the CDPF 2.

The ECU 3 is structured centering on a microcomputer and includes various types of signal processing circuits and calculation circuits. A combustion pressure sensor processing circuit (a sensor circuit) 31 of the ECU 3 receives output signals of the combustion pressure sensors 421–424 and outputs a cylinder pressure maximum value Pmax, ignition timing Tign and combustion amount Qc to a calculation section 33 of the ECU 3. The cylinder pressure maximum value Pmax is a maximum value of the cylinder pressure of the cylinder in one combustion cycle. For instance, the combustion pressure sensor processing circuit 31 includes a peak hold circuit for holding the maximum value of the cylinder pressure in a predetermined crank angle range as the cylinder pressure maximum value Pmax. The ignition timing Tign is a crank angle at which an increase in the combustion pressure P per unit time exceeds a predetermined reference value. Therefore, the combustion pressure sensor processing circuit 31 includes a subtraction circuit for calculating a difference between the successive combustion pressure signals or a comparator for comparing the combustion pressure signal with a reference value. The subtraction circuit outputs the increase in the combustion pressure P per unit time. An integrated value of the combustion pressure P is outputted as the combustion amount Qc.

The combustion pressure sensor processing circuit 31 receives the output signals of the combustion pressure sensors 421–424 in synchronization with the crank angle CA, based on the crank angle signal outputted from a gate circuit 32 of the ECU 3. The gate circuit 32 generates the crank angle signal based on an output signal of the rotation speed sensor 41 and an angle correction signal C outputted from the calculation section 33.

The calculation section 33 executes combustion pressure signal calibration logic, top dead center position calibration logic, injection timing control logic and injection quantity correction logic, based on the cylinder pressure maximum value Pmax, the ignition timing Tign and the combustion amount Qc outputted from the combustion pressure sensor processing circuit 31 and the engine rotation speed signal outputted from the rotation speed sensor 41. The combustion amount Qc is provided in the form of the integrated value of the cylinder pressure P. Consistency between the fuel injection and the combustion is monitored by comparing the combustion amount Qc with the injection quantity Qi.

Next, processing functions of the combustion pressure sensor processing circuit 31 and the calculation section 33 for setting the injection timing Tinj and the injection quantity Qi will be explained based on FIGS. 2A and 2B.

A throttle opening degree measurement section 511 measures a throttle opening degree THR of the throttle valve 212 based on the sensor signal outputted by the throttle position sensor 43. An engine rotation speed measurement section 512 measures the engine rotation speed NE based on the crank angle signal CA outputted by the rotation speed sensor 41. A maximum cylinder pressure measurement section 513 and an ignition timing measurement section 514 are disposed in the combustion pressure sensor processing circuit 31. The function of the calculation section 33 is realized by a control program executed by the computer of the calculation section 33, for instance. An oxygen concentration margin calculation section 515 calculates a margin MO with respect to a target value of the oxygen concentration corresponding to a control value of concentration of particulate matters or smoke, based on the fact that the particulate matters or the smoke included in the exhaust gas increases as the oxygen concentration decreases. The oxygen concentration margin calculation section 515 calculates the margin MO in accordance with the oxygen concentration outputted by the A/F sensor 44. An exhaust gas temperature margin calculation section 516 calculates a margin MT with respect to an upper limit value of the exhaust gas temperature TE, in accordance with the exhaust gas temperature TE outputted by the exhaust gas temperature sensor 45. The upper limit value of the exhaust gas temperature TE is set based on reliability limitation of the engine 1.

The injection timing Tinj and the injection quantity Qi are set based on the above output values. A drive circuit 34 of the injectors 11–14 opens each one of the injectors 11–14 at the predetermined timing for the predetermined period. The drive circuit 34 also drives an actuator for exhaust gas recirculation (EGR) and an actuator for variable nozzle control (VNC) of the turbocharger 23.

The injection timing Tinj is set by one of two injection timing feedback control sections 531, 532. The first injection timing feedback control section (a cylinder-pressure-based feedback control section) 531 calculates a correction value of the injection timing Tinj and feedback-controls the injection timing Tinj so that the cylinder pressure maximum value Pmax coincides with a target pressure value. The second injection timing feedback control section (an ignition-timing-based feedback control section) 532 calculates a correction value of the injection timing Tinj and feedback-controls the injection timing Tinj so that the ignition timing Tign coincides with target timing. A switching condition determination section 52 selects and enables either one of the feedback control sections 531, 532 based on the engine rotation speed NE and the throttle opening degree THR.

Figure 3:
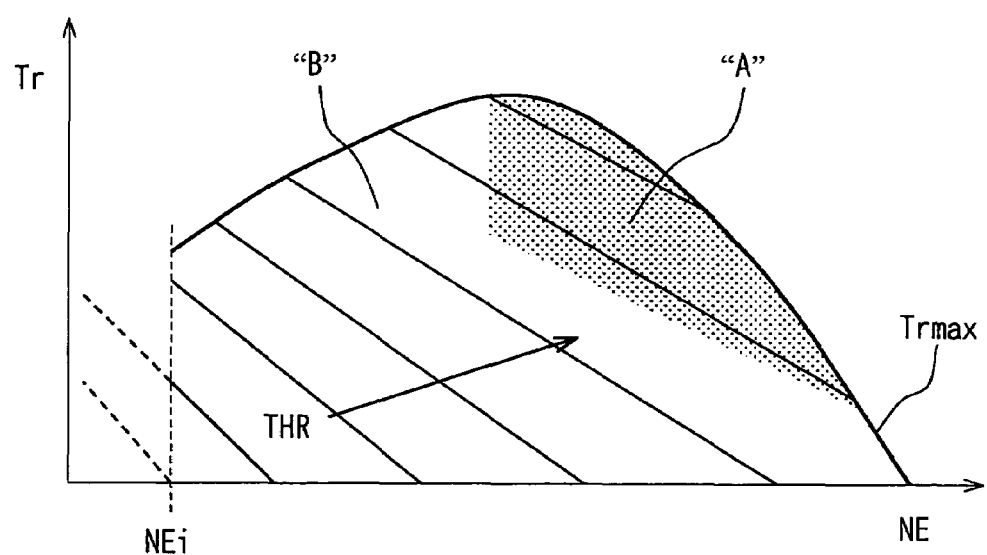
FIG. 3 is a graph showing conditions for switching the injection timing feedback control according to the embodiment.

The switching condition determination section 52 switches between the two feedback control sections 531, 532 based on switching conditions shown in FIG. 3. As shown in FIG. 3, an operation area "A" for enabling the cylinder-pressure-based feedback control section 531 and another operation area "B" for enabling the ignition-timing-based feedback control section 532 are specified by engine torque Tr and the engine rotation speed NE. In FIG. 3, a solid line Trmax indicates maximum torque and NEi is idling rotation speed of the engine 1. In FIG. 3, the throttle opening degree THR increases along an arrow mark THR. A load of the engine 1 is proportional to the engine torque Tr and the engine rotation speed NE. Therefore, the switching condition determination section 52 performs the switching operation based on the throttle opening degree THR and the engine rotation speed NE, which specify the load of the engine 1. The ignition-timing-based feedback control section 532 is selected in a normal operation area shown by the area "B" in FIG. 3. The cylinder-pressure-based feedback control section 531 is selected in a high-load area shown by the shaded area "A" in FIG. 3. More specifically, when the engine rotation speed NE is greater than a predetermined reference speed, the cylinder-pressure-based feedback control section 531 is selected under a condition that the throttle opening degree THR is greater than a reference value. When the engine rotation speed NE is less than the reference speed, the ignition-timing-based feedback control section 532 is selected regardless of the throttle opening degree THR. When the ignition-timing-based feedback control is performed, the injection timing Tinj is controlled to meet an additional requirement that the cylinder pressure maximum value Pmax is limited under an upper limit value. The cylinder pressure maximum value Pmax increases as the ignition timing Tign advances. Therefore, the injection timing Tinj is set in a range in which the cylinder pressure maximum value Pmax does not exceed the upper limit value.

A MAX-MIN guard section 541 receives the injection timing Tinj calculated by one of the injection timing feedback control sections 531, 532. When the injection timing Tinj is out of a predetermined range, the MAX-MIN guard section 541 sets the injection timing Tinj again, and outputs the injection timing Tinj. More specifically, when the injection timing Tinj is equal to or greater than a predetermined upper limit value, the injection timing Tinj is set to the upper limit value. When the injection timing Tinj is less than a predetermined lower limit value, the injection timing Tinj is set to the lower limit value.

Figure 4A:
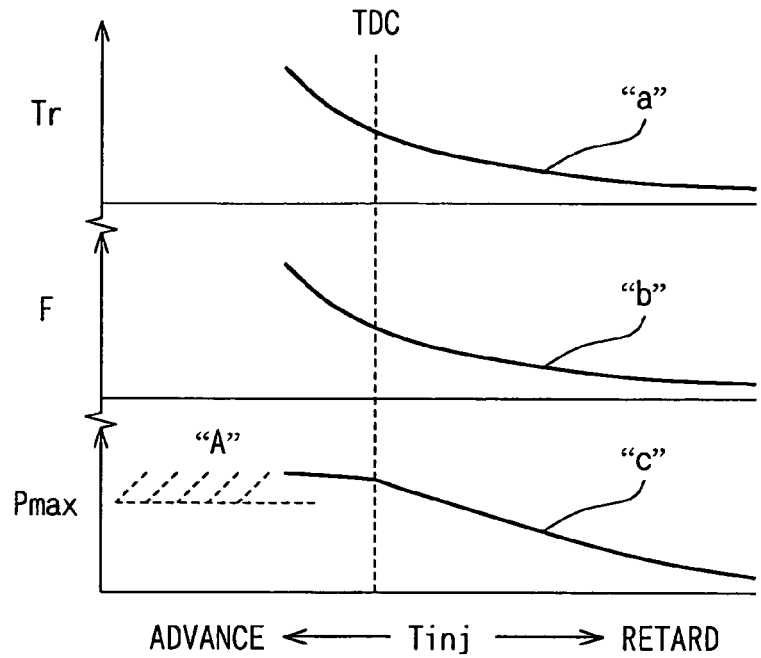
FIG. 4A is a graph showing relationships among torque, gas mileage and a cylinder pressure maximum value of the diesel engine according to the embodiment.
Figure 4B:
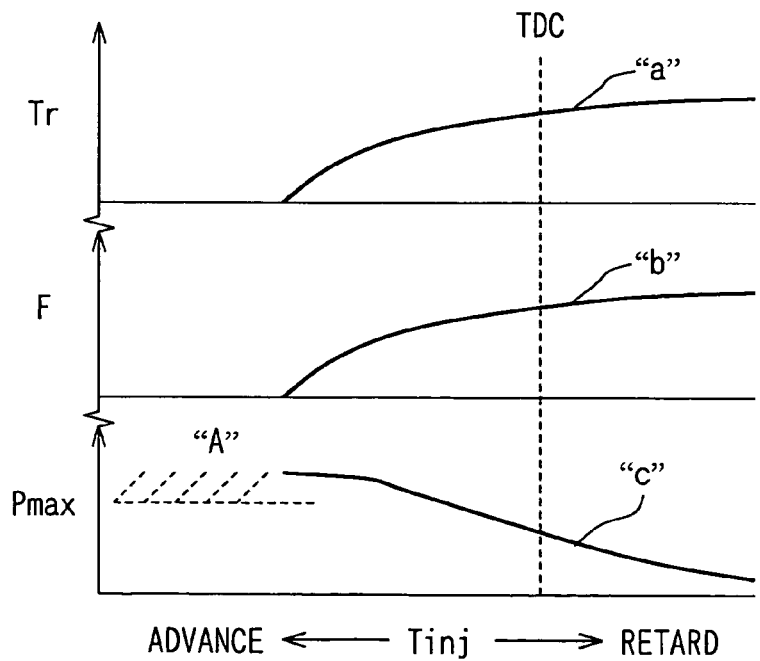
FIG. 4B is another graph showing relationships among the torque, the gas mileage and the cylinder pressure maximum value of the diesel engine according to the embodiment.

Next, the switching operation of the feedback control in the high-load area will be explained based on FIGS. 4A and 4B. Relationships among the torque Tr, the gas mileage F and the cylinder pressure maximum value Pmax with respect to the injection timing Tinj in a high-speed range are shown in FIG. 4A, and the same relationships in a low-speed range are shown in FIG. 4B. The injection timing Tinj is associated with the ignition timing Tign. The ignition timing Tign advances as the injection timing Tinj advances. As the injection timing Tinj advances near the top dead center (TDC), the cylinder pressure maximum value Pmax increases and approaches a cylinder pressure limit value, which is set to protect the engine 1. In the high rotation speed range, a flow rate of the exhaust gas increases and a supercharging pressure provided by the operation of the turbocharger 23 is increased greatly, and the intake air quantity increases. Therefore, the cylinder pressure maximum value Pmax is generally greater in the high rotation speed range than in the low-rotation speed range. For this reason, the advancement of the injection timing Tinj is limited in the high rotation speed range to protect the engine 1.

If the injection timing Tinj is advanced in the high rotation speed range where the cylinder-pressure-based feedback control section 531 is enabled, the cylinder pressure maximum value Pmax increases and the torque Tr increases, and the gas mileage F is improved as shown by solid lines "a", "b" and "c" in FIG. 4A. Therefore, if the target pressure value of the cylinder pressure maximum value Pmax is set to a sufficiently high value in a permissible range "A" of the engine 1, adequate torque can be generated and good gas mileage can be achieved through the cylinder-pressure-based feedback control.

If the injection timing Tinj is advanced in the low rotation speed range, the cylinder pressure maximum value Pmax increases as shown by a solid line "c" in FIG. 4B. However, the torque Tr decreases and the gas mileage F is deteriorated as shown by solid lines "a" and "b" in FIG. 4B. In the low rotation speed range, as shown in FIG. 4B, a peak of the cylinder pressure maximum value Pmax is provided at a crank angle advanced from another crank angle, which provides a peak of the torque Tr. The advancement of the injection timing Tinj is limited in the high rotation speed range but is not limited in the low rotation speed range. Therefore, an actual usable range of the injection timing Tinj of the low rotation speed range differs from that of the high rotation speed range. Therefore, the tendencies of the torque Tr and the gas mileage F in the high rotation speed range differ from the tendencies in the low rotation speed range. If the injection timing Tinj is set through the cylinder-pressure-based feedback control in the low rotation speed range, the torque Tr cannot be generated sufficiently and the gas mileage F is not improved sufficiently. It is because the target value of the cylinder pressure maximum value Pmax is set at a relatively high value in the cylinder-pressure-based feedback control. Moreover, since the cylinder pressure maximum value Pmax decreases as a whole in the low rotation speed range, there is a possibility that the injection timing Tinj is advanced excessively. Therefore, the fuel injection control system of the present embodiment prohibits the cylinder-pressure-based feedback control in the low rotation speed range and selects the ignition-timing-based feedback control. Thus, the appropriate injection timing Tinj can be achieved and the excessive advancement of the injection timing Tinj can be prevented.

If the operation range moves to the high rotation speed range when the ignition-timing-based feedback control is performed, the cylinder pressure maximum value Pmax increases as a whole. In the ignition-timing-based feedback control, the correction value of the injection timing Tinj is calculated so that the cylinder pressure maximum value Pmax does not exceed the upper limit value. Therefore, the engine 1 can be surely protected. In the case where the setting of the target timing of the ignition-timing-based feedback control or the characteristics of the engine 1 show that the cylinder pressure maximum value Pmax does not exceed the upper limit value when the ignition-timing-based feedback control is performed, the limitation of the correction value of the injection timing Tinj based on the cylinder pressure maximum value Pmax may be canceled in the ignition-timing-based feedback control.

Thus, sufficient torque can be obtained and good gas mileage can be ensured by achieving the appropriate injection timing in the entire rotation speed range.

The switching operation to the cylinder-pressure-based feedback control is performed only in the high-load area because the combustion pressure P increases as a whole and an excessive increase of the cylinder pressure maximum value Pmax can occur easily in the high-load area. Alternatively, the injection timing feedback control sections 531, 532 may be switched in the entire load area.

Next, the feedback control of the injection quantity Qi will be explained based on FIG. 2B. An injection quantity feedback control section 533 calculates a correction value of the injection quantity Qi based on the calculated value of the oxygen concentration margin MO so that the oxygen concentration coincides with a target value. In the injection quantity feedback control, the injection quantity Qi is set so that the exhaust gas temperature TE is limited under an upper limit value. A basic injection quantity employed by the injection quantity feedback control section 533 is set with the use of a map based on the throttle opening degree THR and the engine rotation speed NE, for instance.

The injection quantity Qi outputted from the injection quantity feedback control section 533 is inputted to a MAX-MIN guard section 542. When the injection quantity Qi is out of a predetermined range, the MAX-MIN guard section 542 sets the injection quantity Qi again and outputs the injection quantity Qi. More specifically, when the injection quantity Qi is greater than a predetermined upper limit value, the injection quantity Qi is set to the upper limit value. When the injection quantity Qi is less than a predetermined lower limit value, the injection quantity Qi is set to the lower limit value. Thus, abnormal feedback control due to erroneous measurement can be prohibited.

(Modifications)

In the above embodiment, the cylinder-pressure-based feedback control or the ignition-timing-based feedback control is selected in accordance with the engine rotation speed NE. Alternatively, only the cylinder-pressure-based feedback control section 531 may be provided as the feedback control section and the cylinder-pressure-based feedback control may be prohibited in a certain rotation speed range, in which the engine rotation speed is lower than a threshold value. It is because the cylinder pressure maximum value Pmax decreases as a whole in the low rotation speed range, and there is a possibility that the injection timing Tinj is advanced excessively if the cylinder-pressure-based feedback control is performed in the low rotation speed range. Alternatively, only the ignition-timing-based feedback control section 532 may be provided as the feedback control section, and the ignition-timing-based feedback control may be prohibited in a certain rotation speed range, in which the engine rotation speed exceeds a threshold value. It is because the cylinder pressure maximum value Pmax increases as a whole in the high rotation speed range and there is a possibility that the cylinder pressure maximum value Pmax increases excessively if the ignition-timing-based feedback control is performed in the high rotation speed range.

Figure 5:
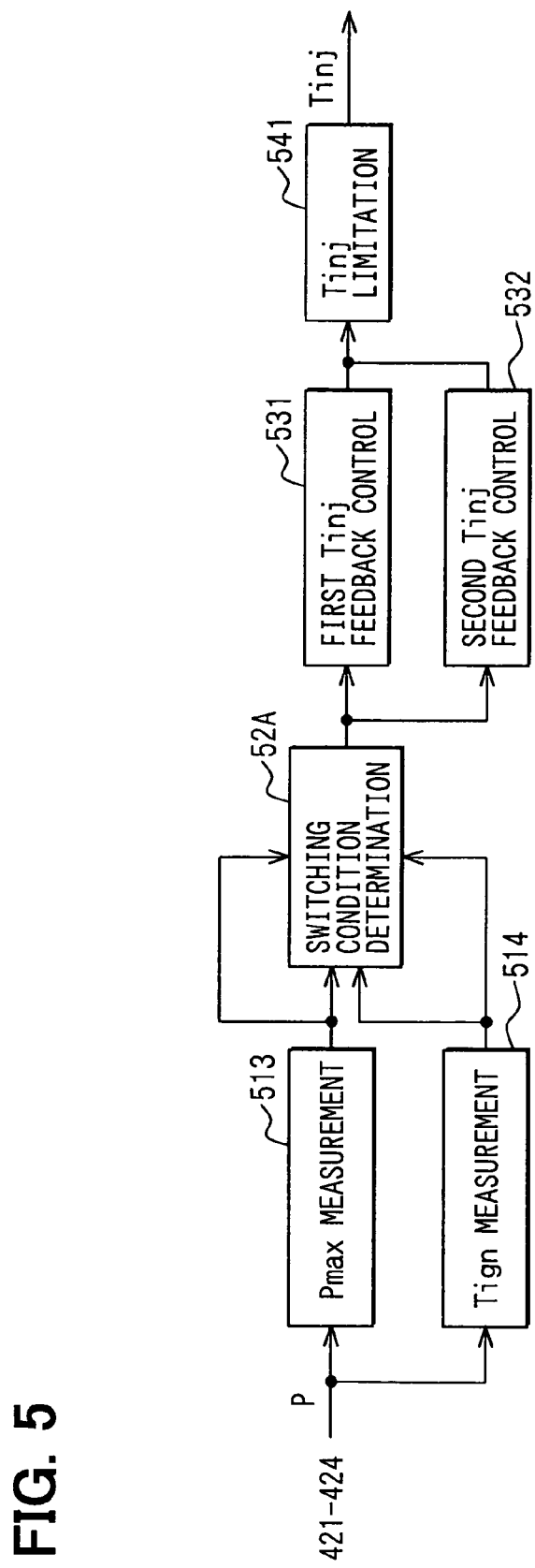
FIG. 5 is a block diagram showing injection timing control processing performed by a fuel injection control system of a modified example of the embodiment.

Instead of switching the feedback control based on the engine rotation speed NE and the throttle opening degree THR, the feedback control may be switched based on other parameters indicating the operating state of the engine 1 as shown in a block diagram of FIG. 5.

As shown in FIG. 5, a switching condition determination section 52A receives the cylinder pressure maximum value Pmax and the ignition timing Tign. The switching condition determination section 52A switches to the cylinder-pressure-based feedback control section 531 if the cylinder pressure maximum value Pmax exceeds a reference cylinder pressure maximum value in a state in which the ignition-timing-based feedback control section 532 is enabled. The switching condition determination section 52A switches to the ignition-timing-based feedback control section 532 if the ignition timing Tign gets ahead of reference ignition timing in a state in which the cylinder-pressure-based feedback control section 531 is enabled.

In the high rotation speed range, the cylinder pressure maximum value Pmax and the torque Tr increase as the ignition timing Tign advances. The cylinder pressure maximum value Pmax will decrease if the operation range makes transition from the high rotation speed range to the low rotation speed range in a state in which the appropriate target pressure value has been achieved in the feedback control performed by the cylinder-pressure-based feedback control section 531 in the high rotation speed range. In this case, the ignition timing Tign tends to advance if the feedback control is performed by the cylinder-pressure-based feedback control section 531. In the low rotation speed range, the cylinder pressure maximum value Pmax increases as the ignition timing Tign advances but the torque Tr decreases as the ignition timing Tign advances. Therefore, there is a possibility that sufficient torque cannot be generated if the feedback control is performed by the cylinder-pressure-based feedback control section 531 in the low rotation speed range. The transition of the operation range to the low rotation speed range, in which the torque Tr decreases as the ignition timing Tign advances, can be detected when the ignition timing Tign gets ahead of the reference ignition timing. At that time, the system switches from the feedback control of the cylinder-pressure-based feedback control section 531 to the feedback control of the ignition-timing-based feedback control section 532. Sufficient torque can be outputted and the gas mileage can be improved by achieving the appropriate target timing in the feedback control performed by the ignition-timing-based feedback control section 532.

In the low rotation speed range, the torque Tr decreases as the ignition timing Tign advances. In the case where the operation range makes transition to the high rotation speed range in a state in which the appropriate target timing has been achieved in the feedback control performed by the ignition-timing-based feedback control section 532, there is a possibility that sufficient torque cannot be outputted if the feedback control is performed by the ignition-timing-based feedback control section 532 in the high rotation speed range, in which the torque Tr increases as the ignition timing Tign advances. The transition to the high rotation speed range can be detected when the cylinder pressure maximum value Pmax exceeds a reference cylinder pressure maximum value. It is because the cylinder pressure maximum value Pmax increases as a whole in the high rotation speed range. Sufficient torque can be outputted and the gas mileage can be improved by switching to the feedback control performed by the cylinder-pressure-based feedback control section 531 when the transition of the operation range to the high rotation speed is detected.

Instead of switching between the cylinder-pressure-based feedback control and the ignition-timing-based feedback control in accordance with the cylinder pressure maximum value Pmax and the ignition timing Tign, only the cylinder-pressure-based feedback control section 531 may be provided as the feedback control section, and the cylinder-pressure-based feedback control may be prohibited in the operation range where the ignition timing Tign gets ahead of the reference timing. Alternatively, only the ignition-timing-based feedback control section 532 may be provided as the feedback control section, and the ignition-timing-based feedback control may be prohibited in the operation range where the cylinder pressure maximum value Pmax exceeds the reference pressure value.

The present invention should not be limited to the disclosed embodiment, but may be implemented in many other ways without departing from the spirit of the invention.

What is claimed is:

1. A fuel injection control system of a compression ignition type internal combustion engine, the fuel injection control system comprising:
   state detecting means for detecting an operating state of the engine; and
   controlling means for controlling fuel injection based on the operating state of the engine, wherein
   the state detecting means includes pressure measuring means for measuring a maximum value of a cylinder pressure of the engine, and
   the controlling means includes:
   first feedback-controlling means for feedback-controlling fuel injection timing so that the cylinder pressure maximum value coincides with a predetermined target pressure value; and
   prohibiting means for prohibiting the feedback control in a certain operation range, in which the cylinder pressure maximum value increases as ignition timing of the engine advances and torque outputted by the engine decreases as the ignition timing advances or is substantially constant even if the ignition timing advances.

2. The fuel injection control system as in claim 1, wherein the state detecting means includes speed measuring means for measuring rotation speed of the engine, and
   the certain operation range is a low rotation speed range.

3. The fuel injection control system as in claim 1, wherein the state detecting means includes timing measuring means for measuring the ignition timing of the engine, and
   the certain operation range is an operation range in which the ignition timing gets ahead of predetermined reference ignition timing if the first feedback-controlling means is enabled.

4. The fuel injection control system as in claim 1, wherein the state detecting means includes exhaust gas measuring means for measuring concentration of particulate matters or smoke discharged from cylinders of the engine, and
   the controlling means includes quantity feedback-controlling means for feedback-controlling an injection quantity of the fuel so that the concentration of the particulate matters or the smoke coincides with predetermined target concentration.

5. The fuel injection control system as in claim 4, wherein the exhaust gas measuring means includes an air-fuel ratio sensor mounted in an exhaust system of the engine and determines that the concentration of the particulate matters or the smoke increases as oxygen concentration decreases.

6. A fuel injection control system of a compression ignition type internal combustion engine, the fuel injection control system comprising:
   state detecting means for detecting an operating state of the engine; and
   controlling means for controlling fuel injection based on the operating state of the engine, wherein
   the state detecting means includes timing measuring means for measuring ignition timing of the engine, and
   the controlling means includes:
   second feedback-controlling means for feedback-controlling fuel injection timing so that the ignition timing coincides with predetermined target timing; and
   prohibiting means for prohibiting the feedback control in a certain operation range, in which a maximum value of a cylinder pressure increases as the ignition timing of the engine advances and torque outputted by the engine increases as the ignition timing advances or is substantially constant even if the ignition timing advances.

7. The fuel injection control system as in claim 6, wherein the state detecting means includes pressure measuring means for measuring the cylinder pressure maximum value, and
   the certain operation range is an operation range in which the cylinder pressure maximum value exceeds a predetermined reference pressure value if the second feedback-controlling means is enabled.

8. The fuel injection control system as in claim 6, wherein the state detecting means includes speed measuring means for measuring rotation speed of the engine, and
   the certain operation range is a high rotation speed range.

9. The fuel injection control system as in claim 8, wherein the state detecting means includes pressure measuring means for measuring the cylinder pressure maximum value, and
   the second feedback-controlling means feedback-controls the fuel injection timing so that the ignition timing coincides with the target timing under a condition that the cylinder pressure maximum value does not exceed a predetermined upper limit value.

10. The fuel injection control system as in claim 6, wherein
   the state detecting means includes exhaust gas measuring means for measuring concentration of particulate matters or smoke discharged from cylinders of the engine, and the controlling means includes quantity feedback-controlling means for feedback-controlling an injection quantity of the fuel so that the concentration of the particulate matters or the smoke coincides with predetermined target concentration.

11. The fuel injection control system as in claim 10, wherein
the exhaust gas measuring means includes an air-fuel ratio sensor mounted in an exhaust system of the engine and determines that the concentration of the particulate matters or the smoke increases as oxygen concentration decreases.

12. A fuel injection control system of a compression ignition type internal combustion engine, the fuel injection control system comprising:
state detecting means for detecting an operating state of the engine; and
controlling means for controlling fuel injection based on the operating state of the engine, wherein
the state detecting means includes pressure measuring means for measuring a maximum value of a cylinder pressure of the engine and timing measuring means for measuring ignition timing of the engine, and
the controlling means includes:
first feedback-controlling means for feedback-controlling fuel injection timing so that the cylinder pressure maximum value coincides with a predetermined target pressure value;
second feedback-controlling means for feedback-controlling the injection timing so that the ignition timing coincides with predetermined target timing; and
switching means for selecting the first feedback-controlling means in a first operation range, in which the cylinder pressure maximum value increases as the ignition timing advances and torque outputted by the engine increases as the ignition timing advances or is substantially constant even if the ignition timing advances, and for selecting the second feedback-controlling means in a second operation range, in which the cylinder pressure maximum value increases as the ignition timing advances and the torque decreases as the ignition timing advances.

13. The fuel injection control system as in claim 12, wherein
the switching means determines that the second operation range is reached if the ignition timing gets ahead of predetermined reference ignition timing in a state in which the first feedback-controlling means is enabled, and determines that the first operation range is reached if the cylinder pressure maximum value exceeds a predetermined reference pressure value in a state in which the second feedback-controlling means is enabled.

14. The fuel injection control system as in claim 12, wherein
the state detecting means includes speed measuring means for measuring rotation speed of the engine, and
the first operation range is a high rotation speed range and the second operation range is a low rotation speed range.

15. The fuel injection control system as in claim 14, wherein
the second feedback-controlling means feedback-controls the injection timing so that the ignition timing coincides with the predetermined target timing under a condition that the cylinder pressure maximum value does not exceed a predetermined upper limit value.

16. The fuel injection control system as in claim 12, wherein
the state detecting means includes exhaust gas measuring means for measuring concentration of particulate matters or smoke discharged from cylinders of the engine, and
the controlling means includes quantity feedback-controlling means for feedback-controlling an injection quantity of the fuel so that the concentration of the particulate matters or the smoke coincides with predetermined target concentration.

17. The fuel injection control system as in claim 16, wherein
the exhaust gas measuring means includes an air-fuel ratio sensor mounted in an exhaust system of the engine and determines that the concentration of the particulate matters or the smoke increases as oxygen concentration decreases.

* * * * *